United States Patent [19]
Takeuchi et al.

[11] Patent Number: 5,650,713
[45] Date of Patent: Jul. 22, 1997

[54] CONTROL DEVICE FOR A HYBRID AUTOMOBILE

[75] Inventors: Kanji Takeuchi, Gamagouri; Yousuke Setaka, Anjo, both of Japan

[73] Assignee: Nippondenso Co., Ltd., Kariya, Japan

[21] Appl. No.: 494,396

[22] Filed: Jun. 26, 1995

[30] Foreign Application Priority Data

Jul. 1, 1994 [JP] Japan ................................. 6-150999
Apr. 4, 1995 [JP] Japan ................................. 7-079166

[51] Int. Cl.$^6$ ................................................ H02P 9/04
[52] U.S. Cl. ....................... 322/16; 322/14; 318/139; 290/40 C; 180/65.3
[58] Field of Search ................. 322/28, 14; 318/139; 290/13, 14

[56] References Cited

U.S. PATENT DOCUMENTS

| | | | |
|---|---|---|---|
| 3,889,127 | 6/1975 | Shibata | 290/14 |
| 4,119,861 | 10/1978 | Gocho | 290/13 |
| 5,345,154 | 9/1994 | King | 318/49 |
| 5,428,274 | 6/1995 | Furutani et al. | 318/139 |
| 5,466,998 | 11/1995 | Kinoshita et al. | 318/375 |
| 5,473,228 | 12/1995 | Nii | 318/158 |
| 5,513,718 | 5/1996 | Suzuki et al. | 180/65.2 |

FOREIGN PATENT DOCUMENTS

| | | |
|---|---|---|
| 0 570 934 | 11/1993 | European Pat. Off. |
| 62-064201 | 3/1987 | Japan |
| 4322105 | 11/1992 | Japan |
| 5111110 | 4/1993 | Japan |
| 000564149 | 10/1993 | United Kingdom ............... 320/1 |

OTHER PUBLICATIONS

Patent Abstracts of Japan, vol. 11, No. 258.
Patent Abstracts of Japan, vol. 17, No. 155.
Patent Abstracts of Japan, vol. 17, No. 377

*Primary Examiner*—Steven L. Stephan
*Assistant Examiner*—Nicholas Ponomarenko
*Attorney, Agent, or Firm*—Cushman, Darby & Cushman IP Group of Pillsbury Madison & Sutro LLP

[57] ABSTRACT

In a control device for a small-scale series-type hybrid automobile using an electric motor and an internal combustion engine as power sources, energy generated by the drive motor is applied to a motor/generator through a generator inverter so that the motor/generator drives the internal combustion engine to apply a braking force thereto. In this way, energy generated during regenerative braking which cannot be absorbed by a saturated battery (for example, when the vehicle is travelling downhill) can be used to help brake the vehicle.

8 Claims, 11 Drawing Sheets

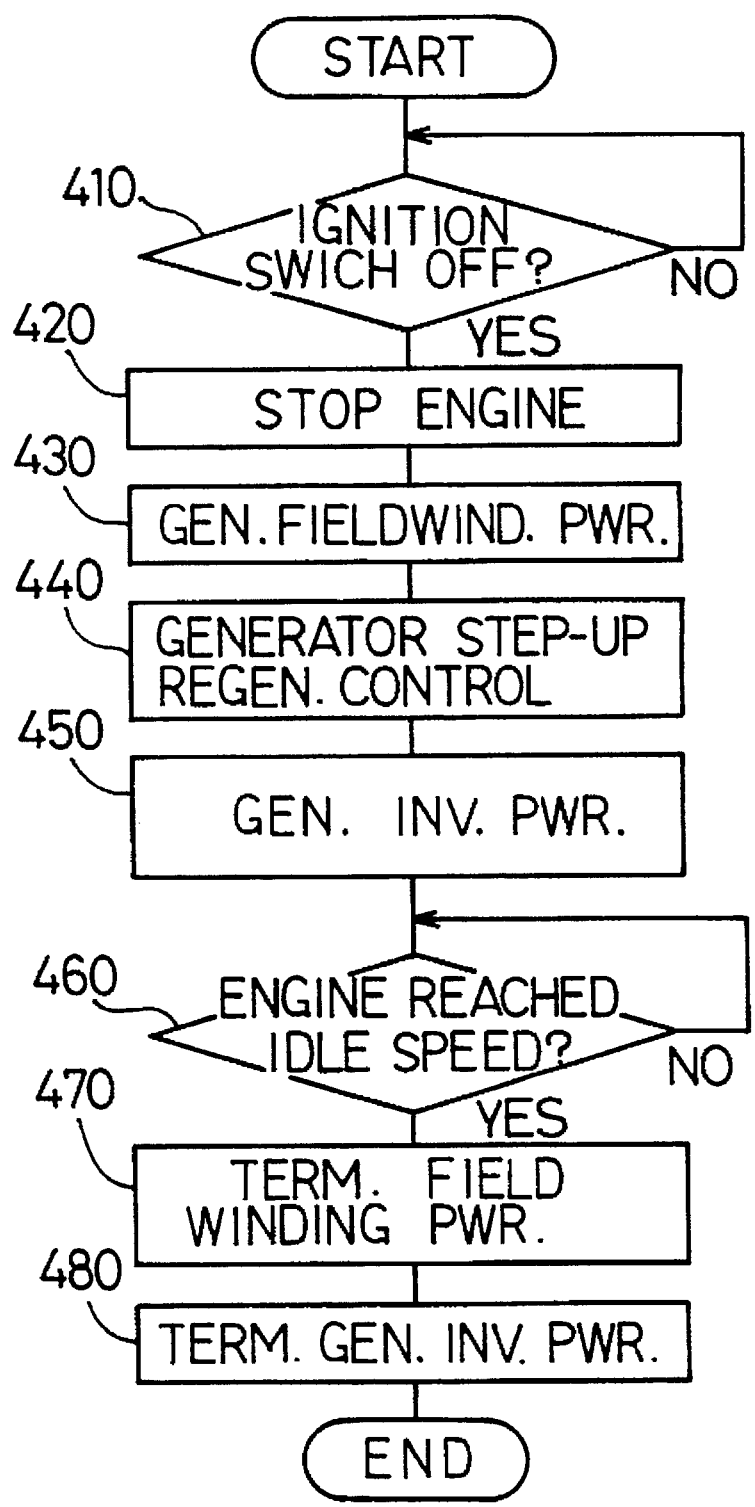

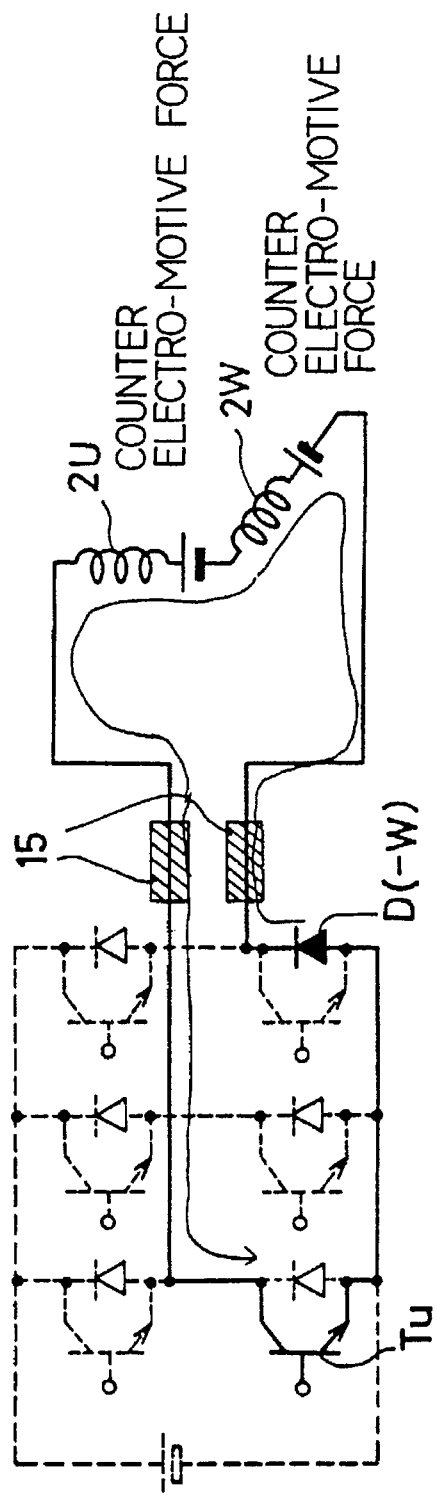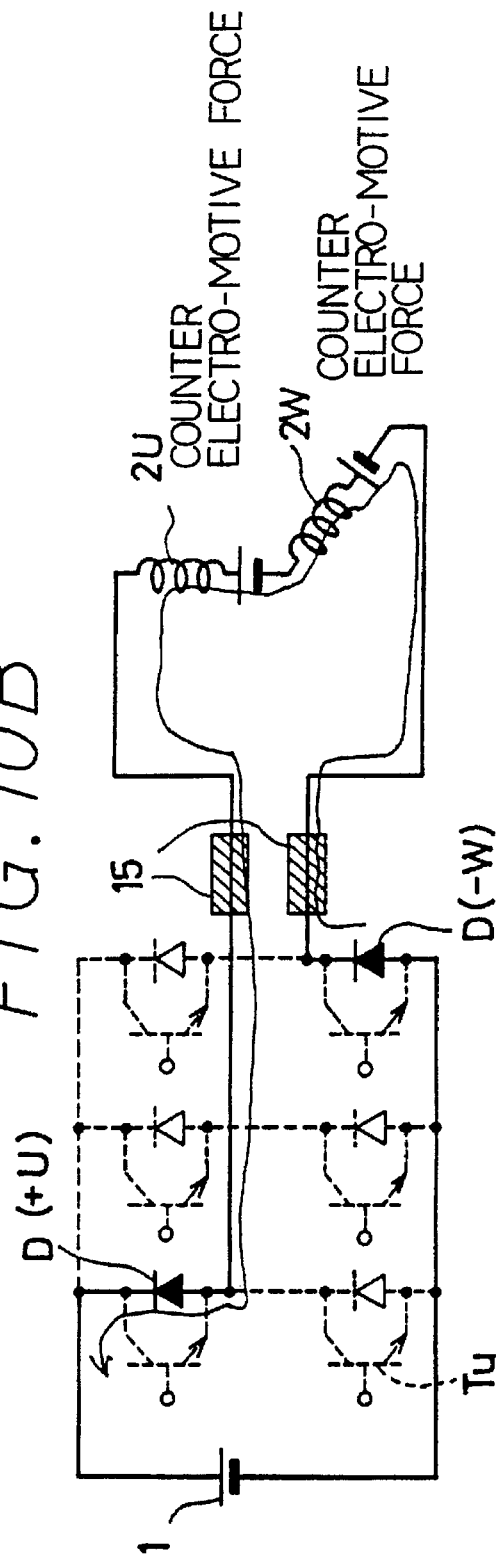

CONTROL DEVICE FOR A HYBRID AUTOMOBILE

CROSS-REFERENCE TO RELATED APPLICATIONS

This application is related to and claims priority under 35 U.S.C. §119 from Japanese Patent Application Nos 6-150999 and 7-79166, the contents of which are hereby incorporated by reference.

BACKGROUND OF THE INVENTION

1. Field of the Invention

The present invention relates to a control device for a series-type hybrid automobile having a generator driven by an internal combustion engine and a battery as on-vehicle power sources which drive the power sources to run the automobile in accordance with an operational state of an accelerator pedal.

2. Description of Related Art

Electric vehicles have been developed as an alternative to automobiles using internal combustion engines which emit harmful exhaust gas. However, in the electric vehicle the energy storage capacity of a battery is small and a runnable distance during one charge cycle thereof is short. Accordingly, there has been a desire for a further increase in the running distance. A series-type hybrid automobile in which the electric automobile is further provided with a generator as an on-vehicle power source and an internal combustion engine for driving the generator has been disclosed as a substitute for the electric vehicle in Japanese Unexamined Patent Publication No. 62-64201.

However, although exhaust gas emissions are reduced in the series-type hybrid automobile in comparison with an automobile having only an internal combustion engine, it is necessary to mount both a battery and an internal combustion engine in the engine compartment. Therefore, it is necessary to mount a battery that is smaller than the one used in an electric automobile. Further, it is necessary to set a charged state of the battery at a sufficiently high level to provide a capacity large enough to sufficiently drive a motor for running the automobile during acceleration and on an uphill road.

As a result, when regenerative braking of the motor for running the automobile is performed where the automobile runs on a long downhill slope, the charging of the battery by current generated by the regenerative braking is promoted by which the battery easily reaches a saturated state of charging. Accordingly, even if the regenerative operation of the motor is performed after the battery has reached the saturated state of charging, the battery cannot be charged, a current level thereof is reduced and a braking force of the motor is lowered whereby a sufficient braking required for a vehicle cannot be provided.

As disclosed in Japanese Unexamined Patent Publication No. Sho. 62-64201, a resistor may be provided and current regenerated by the motor for running may be dissipated by the resistor. However, it is impossible for an engine compartment of limited size to provide insulation against high voltage applied to the resistor and at the same time provide a space large enough to radiate heat from the resistor.

Further, according to Japanese Unexamined Patent Publication No. Hei. 4-322105, when the capacity of a battery is large in regenerative braking of a motor for running, the braking force of the motor is provided to brake an internal combustion engine by making a regenerative current flow in a generator by using an inverter. However, it is necessary to provide a motor inverter for driving a motor, a generator inverter for driving a generator and a power source capacitor having large weight and large configuration to stabilize the operation of the respective inverters which increases the size and complexity of the control circuit.

SUMMARY OF THE INVENTION

It is an object of the present invention to provide a control device for a series-type small-scale hybrid automobile having a generator driven by an internal combustion engine and a battery which exerts a braking force capable of sufficiently dealing with travel of the automobile down a long downhill slope and wherein the device's control circuit system is simplified.

According to a first aspect of the present invention, a control device for a series-type hybrid automobile includes a generator driven by an internal combustion engine; a generator inverter for controlling the generator; a battery charged by an output of the generator and a motor inverter for driving the automobile using battery power in accordance with an operational state of an accelerator pedal wherein a power source capacitor is jointly used by the inverter for running the automobile and the inverter for the generator.

According to a second aspect of the present invention, the generator inverter includes a controller which rotatably controls the generator when used as a motor for driving the internal combustion engine by making current flow by the generator inverter when a capacity of the battery is a predetermined amount or more in regeneratively controlling the motor, whereby the internal combustion engine is driven by the generator.

According to a third aspect of the present invention, a control device for a series-type hybrid automobile including a generator driven by an internal combustion engine includes a battery charged by an output of the generator; a motor inverter for driving a motor to run an automobile battery power in accordance with an operational state of an accelerator pedal and a controller for driving the generator with the generator inverter to rotate the internal combustion engine when starting the internal combustion engine.

According to a fourth aspect of the present invention, the controller has a relay selectively connecting the generator to the inverter and a rectifier.

According to a fifth aspect of the present invention, a control device for a hybrid automobile including a generator driven by an internal combustion engine has a generator inverter rotatably controlling the generator as a motor for driving the internal combustion engine; a battery charged by the output of the generator; a drive inverter for driving a motor to run an automobile using battery power in accordance with an operational state of an accelerator pedal and a controller for driving the generator when a capacity of the battery is a predetermined amount or more in regeneratively controlling the motor, by which the internal combustion engine is driven by the generator, wherein the controller includes a stop control detecting section for detecting a stop control of the internal combustion engine and a current detecting section for detecting current flowing in coils of the generator, and wherein the device performs step-up regenerative braking control of the generator by the generator inverter based on current detected by the current detecting means when the internal combustion engine is stopped.

According to a sixth aspect of the present invention, a control device for a hybrid automobile includes a generator driven by an internal combustion engine; a generator inverter for the generator and for rotatably controlling the generator as a motor for driving the internal combustion engine; a battery charged by an output of the generator; a drive inverter for driving a motor to run an automobile using battery power in accordance with an operational state of an accelerator pedal and a controller for driving the generator when a capacity of the battery is a predetermined amount or more in regeneratively rotating the motor, wherein the controller includes a stop control detecting section for detecting a stop control of the internal combustion engine and a current detecting section for detecting current flowing in coils of the generator, where the device performs a plugging control of the generator using the generator inverter based on the current detected by the current detecting section when the internal combustion engine is stopped.

According to the first aspect of the present invention, when the generator is driven by the internal combustion engine, the output of the generator is controlled by the generator inverter by which the battery is charged and battery power is supplied to the motor for running the automobile in accordance with the operational state of the accelerator pedal.

The power source capacitor is jointly used by the drive inverter for running the automobile and by the generator inverter for the generator and the power of the generator is smoothed by the power source capacitor when it is charged to the battery and current is supplied to the drive inverter via the same power source capacitor.

In this way, a power source capacitor having a large weight and a large size can be omitted since the power source capacitor is jointly used by the drive inverter and the generator inverter. Accordingly, the control device can be downsized, its weight can be reduced and an inexpensive device can be made.

According to the second aspect of the present invention, when a driver encounters, for example, a long downhill slope where running the automobile where the accelerator pedal is not used, the driving of the automobile by the motor is stopped and the motor is rotated by drive wheels whereby the motor performs a regenerative braking. At this time, regenerative current is generated in the motor and charges the battery. When the charge of the battery is a predetermined amount or more, the current is applied to the generator inverter to drive the generator as a motor. The internal combustion engine becomes a rotational load of the generator since it is connected to the generator. The regenerative current of the motor is dissipated by making it flow in the generator. Accordingly, a considerable braking force can be generated in the motor. As a result, the regenerative current is dissipated and regenerative braking can be exerted on running wheels even when the battery is saturated.

In this way, when a driver encounters a long downhill slope or the like, even if the battery is saturated, the current regenerated by the motor can be discharged by applying it to the inverter for the generator. As a result, regenerative braking can continuously be performed by the motor and therefore, the braking force of the automobile can be provided by a small-scaled device. In this case, the braking capacity can be adjusted by the control states of the respective inverters and therefore, a smooth braking force can easily be provided.

According to the third aspect of the present invention, in starting the internal combustion engine, current is applied to the generator by the drive inverter to run an automobile and the internal combustion engine is started by its rotational driving force. A large current capacity is set in the drive inverter to make current flow in the motor and a sufficiently large current can be made to flow when a large starting torque is required as in the case of starting the internal combustion engine. Accordingly, the internal combustion engine can be started up without a starter.

After starting the internal combustion engine, the generator is operated by the rotating force of the internal combustion engine, whereby power is outputted which charges the battery. Further, when the accelerator pedal is operated, the drive inverter drives the motor to run the automobile in accordance with the operational state of the accelerator pedal.

According to the fourth aspect of the present invention, in starting the internal combustion engine the drive inverter is connected to the generator in place of the rectifying circuit and the rectifying circuit is connected to the generator after starting.

A large current capacity is set in the drive inverter for making current flow in the motor and therefore, a sufficiently large current can be made to flow when a large starting torque is necessary as in the case of starting the internal combustion engine.

In this way, in starting the internal combustion engine requiring a large starting torque, the drive inverter having a large current capacity for driving the automobile can be utilized in making current flow in the generator and therefore, the internal combustion engine can be started without a starter. Therefore, an inexpensive and small-scale device can be made.

According to the fifth aspect of the present invention, when the internal combustion engine is stopped after running the automobile where the stop control of the internal combustion engine is detected by the stop control detecting section, the step-up regenerative braking control is performed based on the current detected by the current detecting section for detecting current flowing in coils of the generator. Therefore, a braking force is generated by a short circuit current by its own electro-motive force, the internal combustion engine running due to its inertia receives the braking force of the generator and its rotational speed is quickly lowered.

According to the sixth aspect of the present invention, when the internal combustion engine is stopped after running the automobile where the stop control of the internal combustion engine is detected by the stop control detecting section, plugging control of the generator is performed based on the current detected by the current detecting section for detecting current flowing in coils of the generator. Therefore, a large braking force is generated in the generator by a reverse torque resulting from making current flow in the generator inverter, the internal combustion engine running due to its own inertia receives the braking force of the generator and its rotational speed is rapidly lowered.

In this way, the internal combustion engine receives the braking force by the generator and therefore, its rotational speed is rapidly lowered. Accordingly, other braking devices are not necessary in stopping the rotation of the internal combustion engine and therefore, the size of device is not increased.

BRIEF DESCRIPTION OF THE DRAWINGS

Other objects, feature and characteristics of the present invention as well as the functions of related parts will become more clear from a study of the following detailed description; the appended claims and the drawings, in the accompanying drawings:

FIG. 9 is a flowchart explaining the operation of the fourth embodiment of the present invention;

FIGS. 10A and 10B illustrate partial circuit diagrams for explaining the operation of the fourth

DETAILED DESCRIPTION OF THE PREFERRED EMBODIMENTS

An explanation will be given of a first embodiment of the present invention with regard to a series-type hybrid automobile shown in FIG. 1 as follows.

Figure 1:
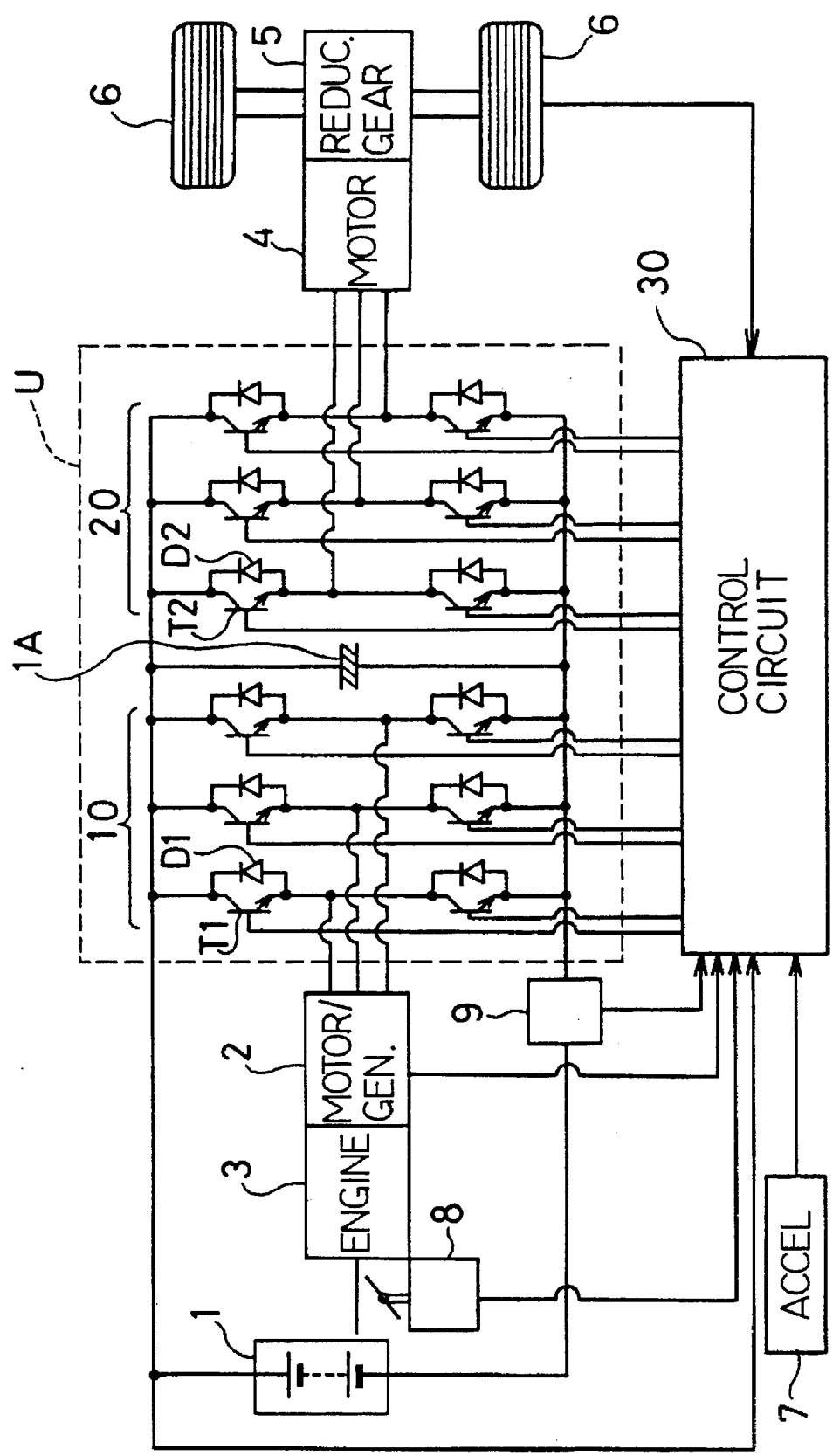
FIG. 1 is a block diagram showing a control system in a series-type hybrid automobile according to a first embodiment of the present invention.

In a hybrid automobile as shown in FIG. 1, numeral 1 designates a battery installed as an on-vehicle power source and numeral 2 designates a three-phase alternating current generator having a position detector (not shown) for detecting rotational positions of a rotor using, for example, a hole element or the like for using the generator also as a motor. Numeral 3 designates an internal combustion engine for driving the generator 2.

Further, numeral 4 designates a motor for running the automobile, numeral 5 designates a reduction gear and numeral 6 designates drive wheels.

The stator coils of the generator 2 are, for example, in a Y-connection and their output lines are connected to a generator inverter 10.

The generator inverter 10 includes six diodes D1 and six switching transistors T1 provided in correspondence with respective three-phase windings of the generator 2, and the generator inverter 10 is connected to a battery 1.

In the generator inverter 10 the diodes D1 output current by rectifying a counter electro-motive force of the current by rectifying a counter electro-motive force of the generator 2 when the generator 2 is driven by the internal combustion engine 3 and supplies output power to the battery 1 and a drive inverter 20 for running the automobile, mentioned later. Further, when the internal combustion engine 3 is started or when decelerating for braking the vehicle, the transistors T1 perform a predetermined switching operation responsive to the control circuit 30 and drive the generator 2 by operating the generator 2 as a motor.

The drive inverter 20 for running the automobile includes six diodes D2 and six transistors T2 having a similar structure as in the generator inverter 10 is installed on the output side of the generator inverter 10 in parallel therewith.

The drive inverter 20 performs a switching operation for driving the motor 4 installed for running the vehicle and performs a regenerative operation in decelerating the vehicle.

The above-mentioned generator inverter 10 and the drive inverter 20 are controlled by a control circuit 30.

The control circuit 30 performs starting control of the internal combustion engine 3 by the generator 2, traction control using the motor 4, braking control in decelerating the vehicle, charging control and the like.

In the starting control of the internal combustion engine 3, when the car is started by operating an ignition key switch (not shown), the generator inverter 10 is operated, current is supplied from the battery 1 to the generator 2 and the generator 2 is operated as a motor by which the internal combustion engine 3 is driven to start.

In the traction control, the motor 4 is driven by controlling the drive inverter 20 in accordance with a degree of depression of the accelerator pedal 7 by which the automobile is run at an arbitrary speed. In this case, a switching operation is performed on the motor 4 in accordance with signals of a position detector (not shown) detecting rotational positions of a rotor by which the speed of the motor 4 is controlled.

In the speed control operation, the charge on the battery may fall below a predetermined level when the current draw by the motor 4 increases due to depression of the accelerator pedal 7 or travel of the vehicle up a steep hill. To compensate for this, a throttle control device enlarges a throttle opening angle of the internal combustion engine 3 to increase the amount of air intake thereto and to thereby increase the rotational speed of the internal combustion engine 3 to compensate for the deficiency of the battery 1. At the same time the field current of the generator 2 is increased to increase the output of the generator 2 and charge the battery 1. The battery voltage and the output of a current sensor 9 can be used to determine whether the battery charge level will fall below the predetermined level.

Meanwhile, when decelerating the vehicle by releasing the accelerator pedal 7, braking control of the motor 4 is performed so that a braking force is applied on the drive wheels 6 other than that by operating a brake (not shown).

In the braking control, the motor 4 is driven in an opposite direction by the drive wheels 6 and at this time, the braking force can be applied on the drive wheels 6 by performing regenerative control with the motor 4.

The battery 1 is apt to be saturated since current generated by the regenerative control of the motor 4 normally charges the battery 1 and the current due to the regenerative control can not be completely absorbed by the battery 1 in cases where the automobile runs on a long downhill slope and the like. In such a case, the energy can be dissipated by driving the generator 2 using the generator inverter 10 to forcibly rotate the internal combustion engine 3. Thereby, the braking force can continuously be generated while preventing over-charging of the battery 1 by consuming the regenerative current regenerated in the motor 4 by driving the generator 2 as a motor.

Further, the generator inverter 10 and the drive inverter 20 are preferably integrated into a single unit U and a power source capacitor 1A is jointly used by the generator inverter 10 and the drive inverter 20 for stabilizing power supplied thereto. With regard to heat sinks for the diodes D1 and D2 and the transistors T1 and T2, timings for operating the diodes and the transistors of the respective inverters 10 and 20 are different and therefore, sufficient heat sinking capacity can be provided by jointly sharing one sink by which the total heat sink area can be downsized.

Further, it is not necessary to increase the electrical capacitance or power handling capability of the power source capacitor 1A due to its joint usage. As in the case where the generator 2 connected to the internal combustion engine 3 is driven as a motor when the motor 4 for running the automobile generates power, the flow of current is always one-directional and exclusive in the drive inverter 20 and in the generator inverter 10 and therefore, the magnitude of the current to be absorbed by the power source capacitor 1A remains unchanged.

Figure 2:
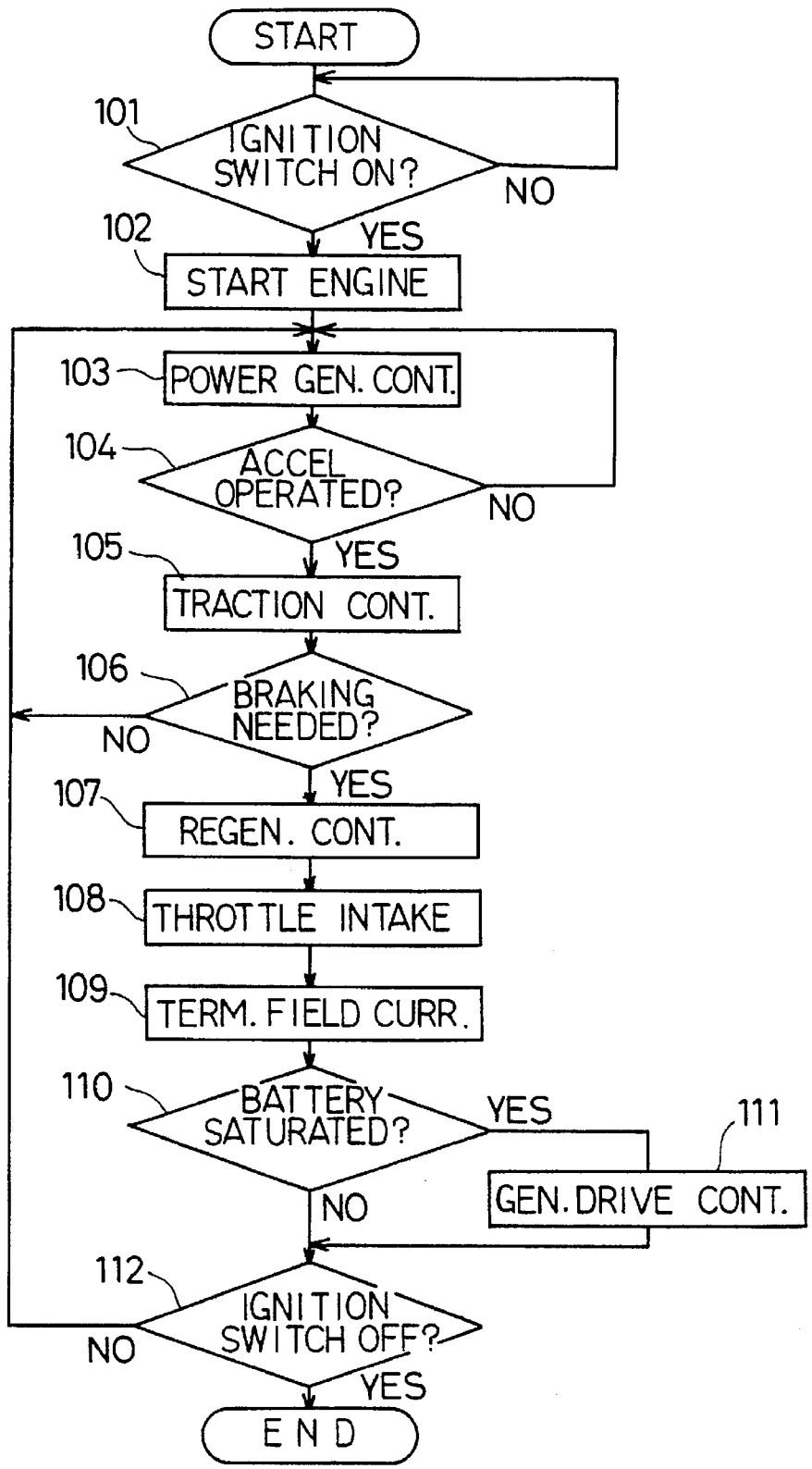
FIG. 2 is a flowchart explaining the operation of the first embodiment of the present invention.

Next, an explanation will be given of control operations in a hybrid automobile of this embodiment including the above-described structure in reference to FIG. 2.

When the automobile is started using the ignition key switch (YES in step 101), the generator inverter 10 is controlled by the control circuit 30 and the generator 2 operates as a motor by receiving current which drives the internal combustion engine 3, whereby the internal combustion engine 3 is started (step 102). When the speed of the internal combustion engine 3 reaches a predetermined idling level, the current flowing to the generator inverter 10 is terminated, and the operation is in a power generating control state in which the generator 2 is driven by the rotation of the internal combustion engine 3 (step 103) while waiting for depression of the accelerator pedal 7.

When the accelerator pedal 7 is not operated during the operation of the internal combustion engine 3 (NO in step 104), the vehicle speed of the automobile is 0 km and in this case the power generating control in step 103 is performed.

When the accelerator pedal 7 is depressed (YES in step 104), the traction control in which the drive inverter 20 is controlled in response to the operation of the accelerator pedal 7 (step 105), the motor 4 is driven by making current flow therein, the rotation thereof is transferred to the drive wheels 6 via a reduction gear 5 and the automobile is run at an arbitrary speed.

When the braking by the motor 4 is not necessary during running (NO in step 106), steps 103 to 105 are repeated and the automobile is run or stopped in accordance with the operations of the accelerator pedal 7 and the brake.

When a driver encounters a long downhill slope in running the automobile and braking of the motor 3 other than by the brake is necessary (YES in step 106), regenerative control of the motor 4 is performed by the drive inverter 20 (step 107), the throttle angle of the internal combustion engine 3 is narrowed, and the intake air amount is throttled (step 108) thereby decreasing rotational speed of the internal combustion engine 3. Further, the output of the generator 2 is terminated by terminating the field current of the generator 2 (step 109).

As a result, the current regenerated by the regenerative control of the motor 4 flows to the battery 1 and at that moment, are used to determine whether the battery 1 is in a saturated state of charging is determined based on the level of a current sensor 9 and the voltage of the battery 1.

Figure 3:
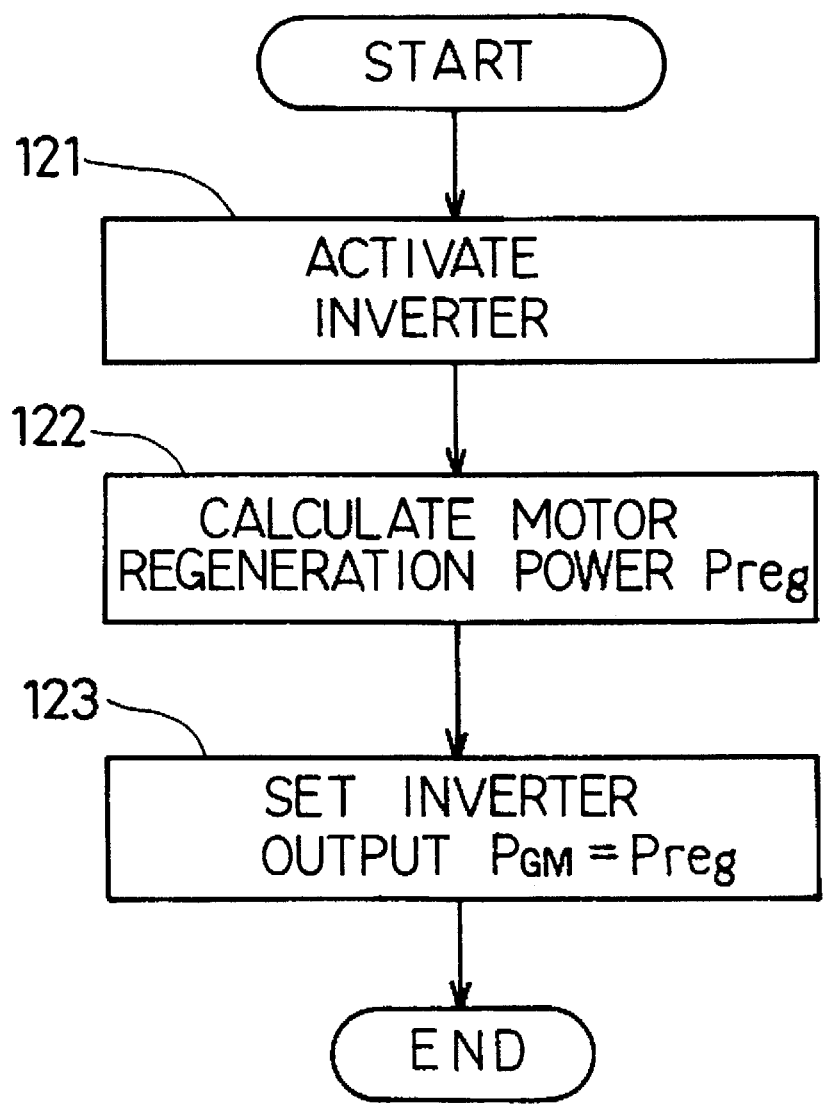
FIG. 3 is a flowchart explaining a control for driving a generator in the first embodiment of the present invention.

When the battery 1 is not saturated (YES in step 110), generator drive control as shown in FIG. 3 is performed (step 111).

As shown in FIG. 3, in the generator drive control the generator inverter 10 is rendered operative (step 121), the operation calculates power generated by the regenerative control of the motor 4 (step 122) and the operation sets the output of the generator inverter 10 at the calculated power level (step 123) by which the power generated by the regenerative braking is dissipated by the generator 2.

Accordingly, the current regenerated by the motor 4 is utilized by the generator 2 for driving the internal combustion engine 3 and therefore, current is made to flow in the motor 4 which results in a braking force on the drive wheels 6 and a sufficiently large braking force can be applied thereon even when current is not made to flow to the battery 1.

Thereafter, when the ignition key switch is turned on (NO in step 112), step 112 and later steps are repeated. When the ignition key switch is turned off (YES in step 112), the internal combustion engine 3 is stopped and the control operation is finished.

As stated above, in this embodiment, when the braking corresponding only to the engine braking is necessary in running the vehicle, it is possible to provide the braking force while still making the current regenerated in the motor 4 flow to the battery 1. Further, when the battery 1 is saturated, the regenerative current from the motor 4 can be made to flow without charging the battery 1 by dissipating the power by driving the generator 2 with the generator inverter 10, whereby the internal combustion engine 3 is driven by which the braking force to the vehicle can be provided. Accordingly, a sufficient braking force corresponding to the engine braking can always be provided even when the vehicle is running on a long downhill slope.

Figure 4:
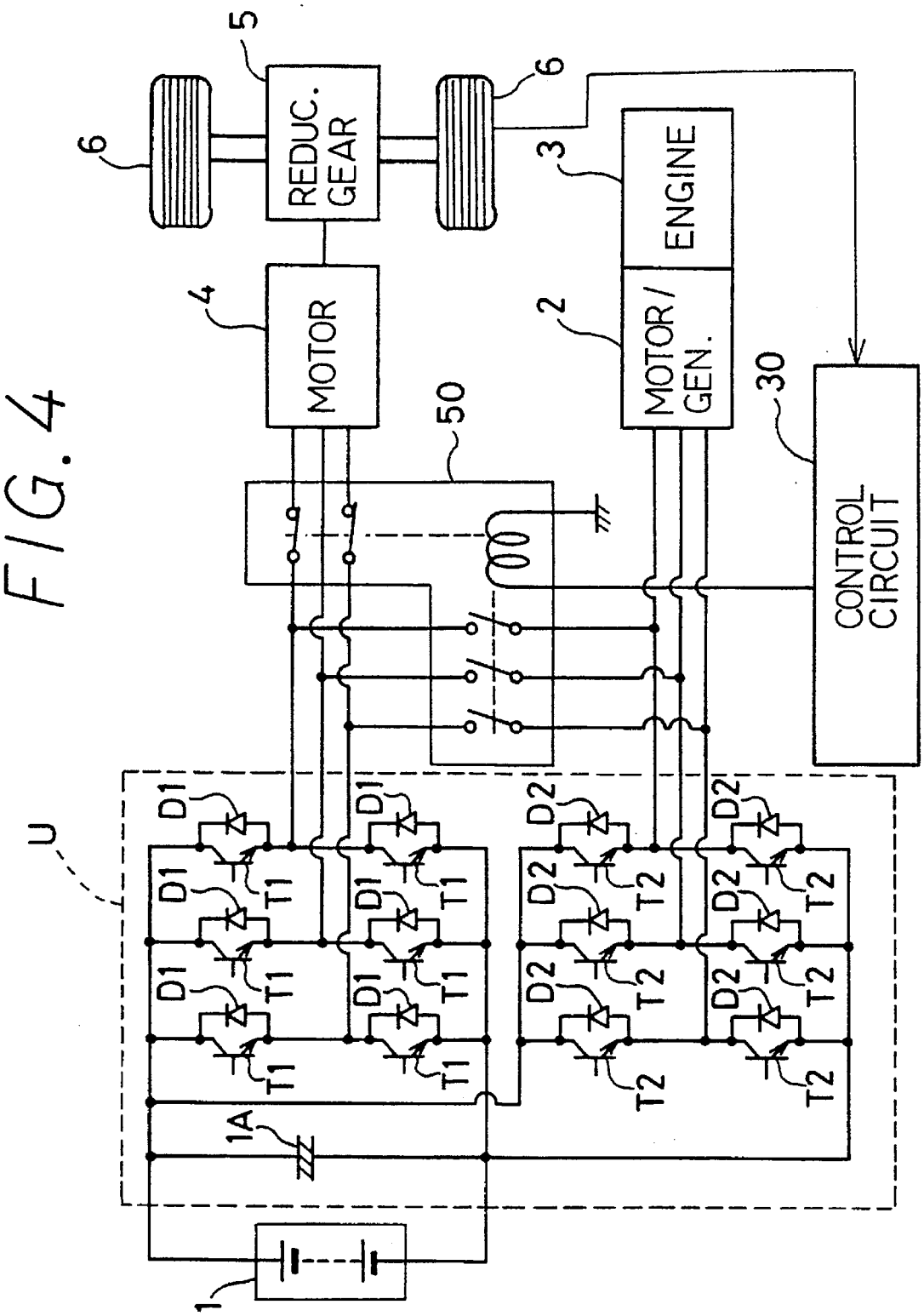
FIG. 4 is a block diagram showing a control system in a series-type hybrid automobile according to a second embodiment of the present invention.
Figure 5:
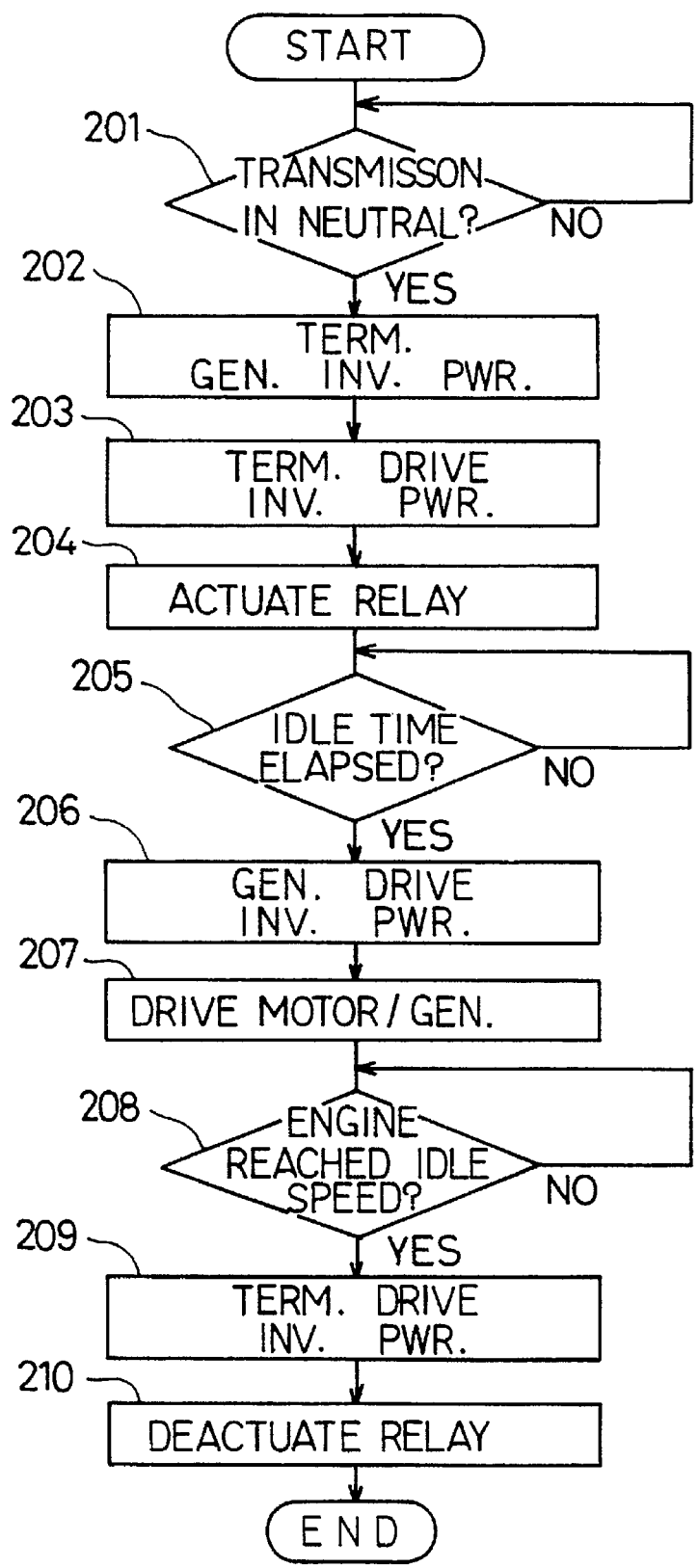
FIG. 5 is a flowchart explaining the operation of starting control of an internal combustion engine according to the second embodiment of the present invention.

Next, an explanation will be given of a second embodiment of the present invention with reference to FIG. 4 and FIG. 5.

In the second embodiment a switch (or relay) 50 for switching connection of the generator 2 to the generator inverter 10 and to the drive inverter 20 is installed and the starting control of the internal combustion engine 3 is performed after a switching control in which the drive inverter 20 is connected to the generator 2 by the control circuit 30 only when starting the internal combustion engine 3.

An explanation will be given of the control operation with respect to the starting control of the internal combustion engine 3 in the second embodiment with reference to FIG. 5 as follows.

When the automobile is started by operating the ignition key switch, the operation determines whether a transmission shift lever is in a neutral position and the starting control is not performed when it is not at the neutral position.

When it is at the neutral position (YES in step 201), power to the generator inverter 10 is switched off (step 202), power to the drive inverter 20 for running the automobile is subsequently switched off (step 203), and thereafter, current flows in the relay 50 (step 204) and the operation is idle for a predetermined period of time (NO in step 205). When the predetermined period of time has elapsed since the current has flowed through the relay 50 (YES in step 205), terminals of the relay 50 are switched if they have not already been switched.

Thereafter, when power to the drive inverter 20 for running the automobile is switched on (step 206), the generator 2 is driven as a motor by the drive inverter 20 (step 207) by which the internal combustion engine 3 is driven to rotate.

When the rotational speed Ne of the internal combustion engine 3 reaches an idling level or more (YES in step 208), the internal combustion engine 3 is started, the operation switches off power to the drive inverter 20 (step 209), the relay 50 is de-energized (step 210) and the generator 2 is again connected only to the generator inverter 10.

As stated above, in the second embodiment, in starting the internal combustion engine current from in the generator 2 by utilizing the drive inverter 20 which has a large output and therefore, a large starting torque is easily provided to drive the internal combustion engine 3. Therefore, the generator inverter 10 may be provided with a small current capacity which is enough to drive the generator 2 only during braking of the automobile and therefore, a small inverter can be used in comparison with that in the above-mentioned first embodiment. Accordingly, considerable downsizing of an inverter unit including the generator inverter 10 and the drive inverter 20 can be achieved by adding only the relay 50 thereto.

Figure 6:
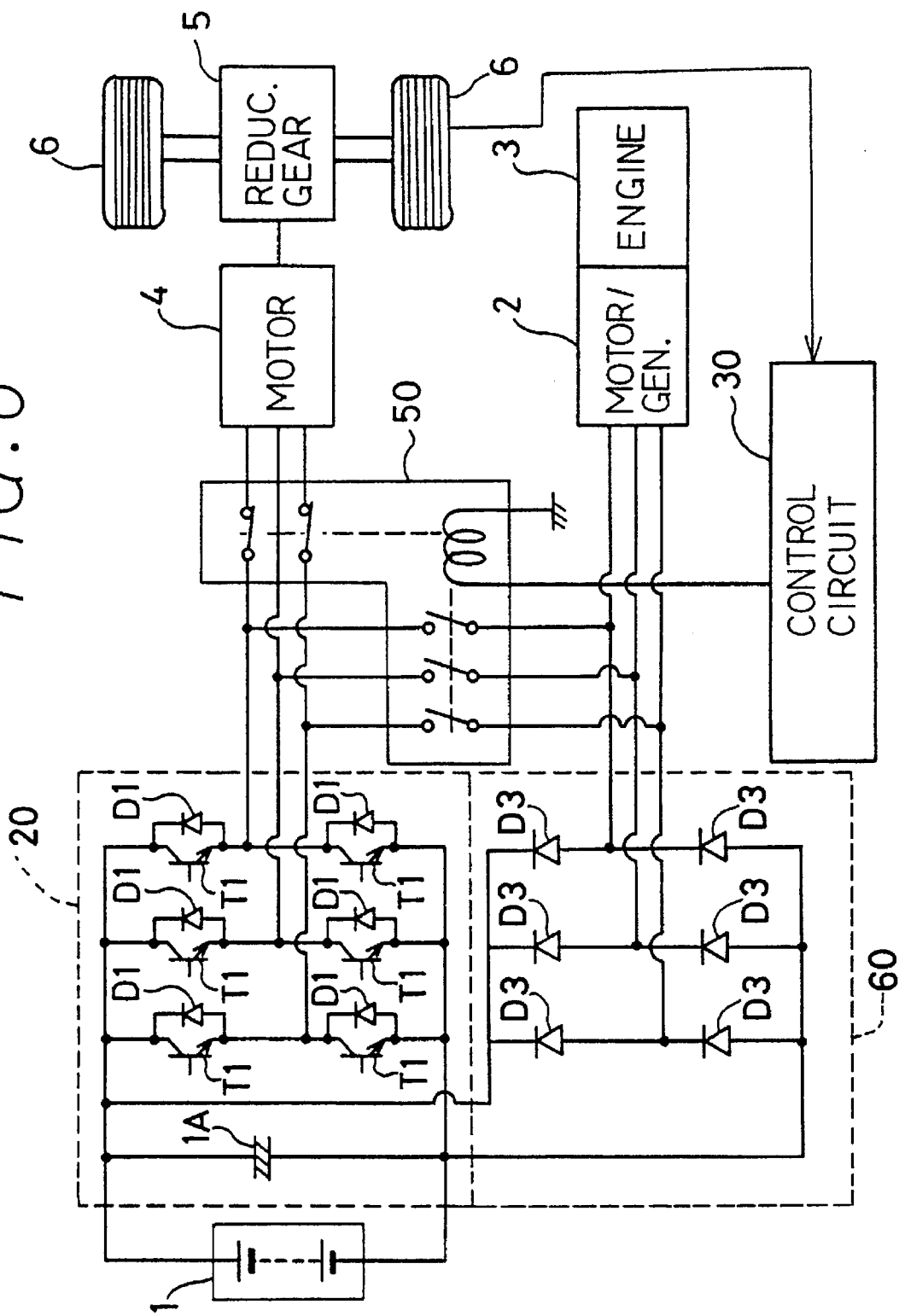
FIG. 6 is a block diagram showing a control system of a series-type hybrid automobile according to a third embodiment of the present invention.
Figure 7:
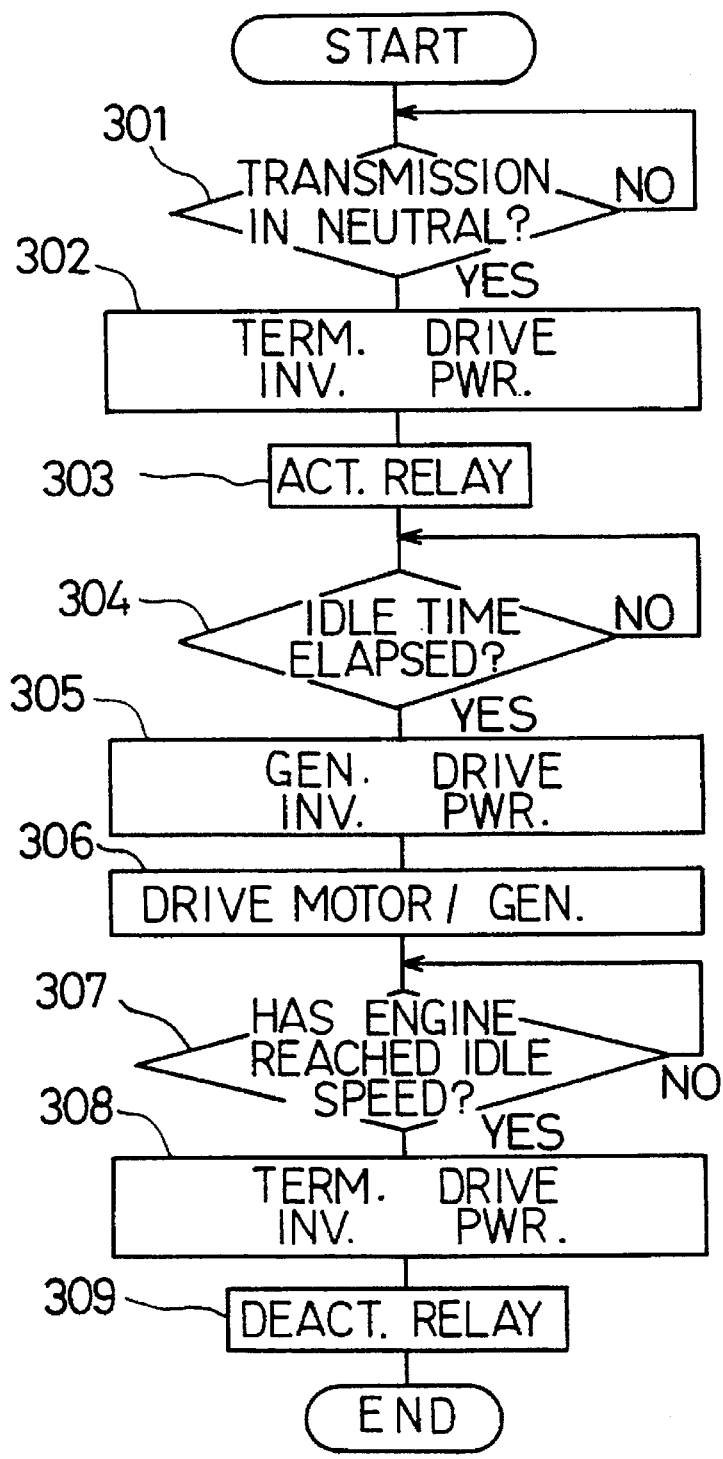
FIG. 7 is a flowchart explaining the operation of starting control of an internal combustion engine according to the third embodiment of the present invention.

FIGS. 6 and 7 show a third embodiment of the present invention.

In this embodiment, a generator inverter is not installed, a drive inverter 20 for making current flow in a motor 4 and a rectifier 60 for rectifying an output voltage of a generator 2 are installed and a relay 50 is installed for switching connection of the generator 2 to the rectifier 60 and to the drive inverter 20.

Further, as shown in FIG. 7, a control circuit 30 controls the relay 50 so that the drive inverter 20 is connected to the generator 2 only when starting the internal combustion engine 3 to thereby perform the starting control of the internal combustion engine 3.

In this way, in this embodiment the internal combustion engine 3 can be started by driving the generator 2 using the drive inverter 20 after switching the relay 50 in starting the internal combustion engine 3.

Further, a large starting torque for driving the internal combustion engine 3 can easily be provided since the output of the drive inverter 20 is large.

Thereby, downsizing of the device can be achieved by adding only the relay 50 thereto since the internal combustion engine 3 can be started without installing a starter or a generator inverter.

Figure 8:
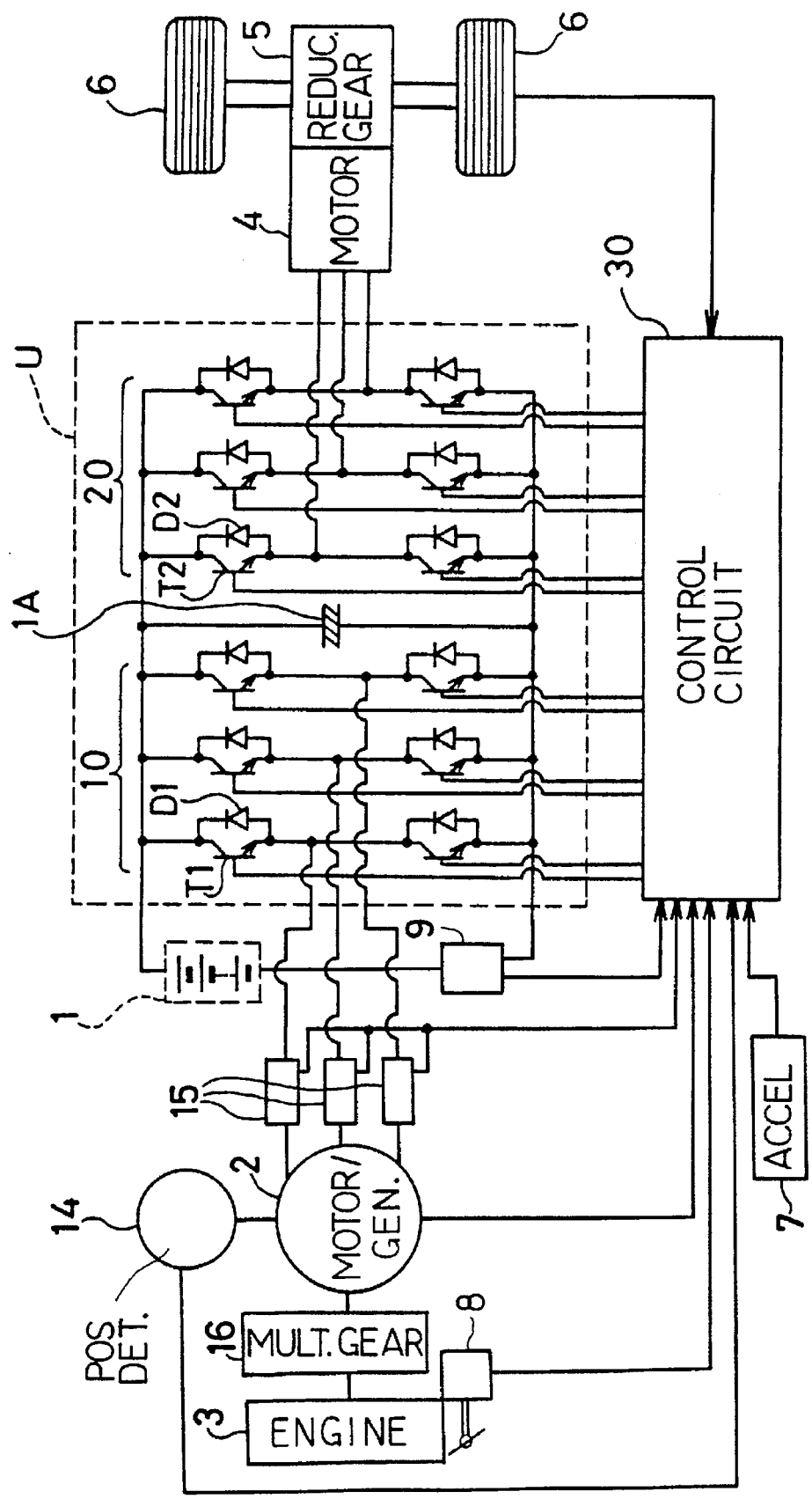
FIG. 8 is a block diagram showing a control system of a series-type hybrid automobile according to a fourth embodiment of the present invention.
Figure 11A:
FIGS. 11A–11F illustrate time charts explaining the operation of the fourth embodiment of the present invention.
Figure 11B:
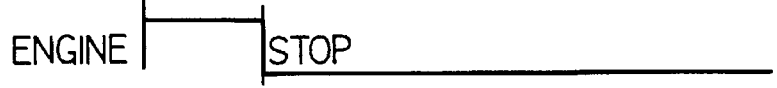
Figure 11C:
Figure 11D:
Figure 11E:
Figure 11F:
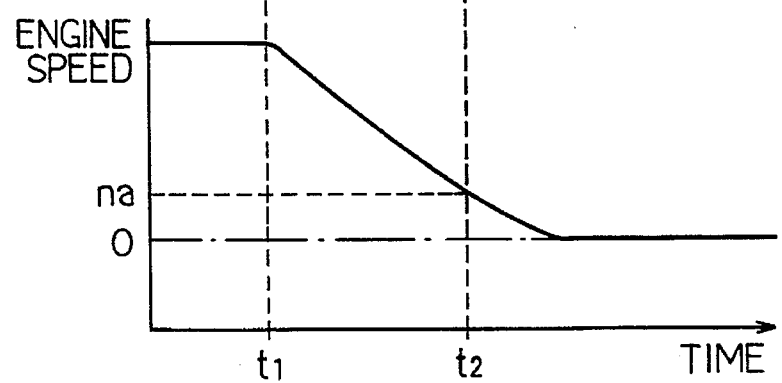

FIG. 8 shows a fourth embodiment of the present invention.

In FIG. 8, numeral 14 designates a position detector for detecting rotational positions of a rotor of a generator 2 and numeral 15 designates current detectors for detecting phase currents of the generator 2.

A control circuit 30 makes a predetermined amount of current flow in predetermined coils of the generator 2 by successively driving transistors T1 of the generator inverter 10 in accordance with signals from the position detector 14 as in the above-mentioned embodiments.

Further, in the stop control of the internal combustion engine a predetermined current flows in predetermined coils of the generator 2 by successively driving the transistors T1 in accordance with signals from the position detector 14 so that a braking force is generated in the internal combustion engine 3 by performing a step-up regenerative braking control or a plugging control.

An explanation will be given of the operation of the step-up regenerative braking control in the stop control of the internal combustion engine 3 according to the fourth embodiment with reference to FIG. 9 as follows.

The operation determines how a driver handles an ignition key switch and continues the power generating operation as it is when the ignition key switch is turned on (NO in step 410). When the ignition key switch is turned off (YES in step 410), the control circuit 30 stops supplying fuel to the engine or stops ignition in the engine to thereby stop the internal combustion engine 3 (step 420).

Thereafter, braking control of the internal combustion engine 3 is performed using the generator 2.

In the braking control, field current flows in field windings of the generator 2 by applying a predetermined voltage thereto (step 430), the control circuit 30 for controlling the generator inverter 10 is set in a step-up regenerative control mode (step 440) and the operation starts the generator inverter 10 (step 450).

As a result, the internal combustion engine 3 is braked by the generator 2 and its rotational speed is rapidly decreased. When the rotational speed Ne of the internal combustion engine 3 is larger than a predetermined level (corresponding to a predetermined rotational speed) na (NO in step 460), the operation waits until the rotational speed Ne becomes a predetermined level (corresponding to a predetermined rotational speed) na or less.

When the rotational speed Ne of the internal combustion engine 3 is at the predetermined level (predetermined rotational speed) na or less (YES in step 460), the operation determines that the internal combustion engine 3 is stopped, the field current is terminated by turning off the voltage applied to the field windings (step 470) and the operation stops the generator inverter 10 (step 480), thereby finishing the braking control.

Next, an explanation will be given of the operation of the generator inverter 10 in the braking control in steps 430 to 450 with reference to FIGS. 10A and 10B.

The braking control is performed by turning the transistors T1 of the generator inverter 10 on and off based on positional signals of the position detector 14 including a magnetic pole sensor and detected current levels of the current detectors 15 each comprising a current sensor. Here, an example will be given where the position of the rotor of the generator 2 detected based on the positional signal of the position detector 14 is at a location in which current by a counter electro-motive force flows in a U-phase winding 2U and a W-phase winding 2W.

When the generator 2 is rotating and the rotor is at a position of 120°, the operation turns on a transistor Tu to short circuit the windings as shown in FIG. 10A. Thereby, the counter electro-motive force of the respective windings is formed through a diode D(-W) and therefore, the generator 2 is braked and electromagnetic energy is accumulated by the closed circuit.

When the level of the short circuit current detected by the current detectors 15 rises to a predetermined current level, the transistor Tu is turned off as shown in FIG. 10B. As a result, current flows to a battery 1 via diodes D(+U) and D(-W) by the counter electro-motive force caused by the short circuit current by which the battery is charged and the operation is successively repeated.

Further, when the rotor is rotated, operating transistors and windings in which the short circuit current flows are switched and the above-mentioned operation is similarly repeated thereafter.

The counter electro-motive force generated in the windings of the generator 2 is proportional to the rotational speed of the generator 2 and therefore, when the rotational speed is lowered, the counter electro-motive force is not generated and the braking control is automatically stopped.

In this embodiment, when the rotational speed of the generator 2 decreases, the braking control is automatically finished and therefore, the generator 2 is not reversely rotated, the battery 1 can be charged and accordingly, the energy can effectively be utilized.

As shown in FIGS. 11A–11F, the rotational speed of the internal combustion engine 3 is rapidly lowered and the internal combustion engine 3 is rapidly lowered and the internal combustion engine 3 can be stopped in a short period of time by performing the above-mentioned braking control.

Although a position detector was used in the embodiment of FIG. 8, the positional detection may be performed by using a counter electro-motive force detecting circuit.

Although in the above embodiment the control circuit 30 performs step-up regenerative braking in stopping the internal combustion engine 3, the generator inverter 10 may be controlled by making current flow therein to generate a rotational torque by which the generator 2 tends to be rotated in the reverse direction. In this case, although it is necessary to control the generator 2 to firmly stop whereby the internal combustion engine 3 is not rotated in the reverse direction, the braking torque of the internal combustion engine 3 is not lowered since the rotational torque of the reverse rotation is not lowered even when the rotational speed has been lowered. Accordingly, the internal combustion engine 3 can be stopped more quickly.

The present invention has been described in connection with what are presently considered to be the most practical and preferred embodiments; however, the invention is not meant to be limited to the disclosed embodiments, but rather is intended to include all modifications and alternative arrangements included within the spirit and scope of the appended claims.

What is claimed is:

1. A control system for use in a series-type hybrid automobile, the control system comprising:
   an internal combustion engine;
   a generator driven by the internal combustion engine;
   a battery charged by an output of the generator;
   a drive motor for propelling the automobile;
   a drive inverter for applying power from the battery to the drive motor responsive to an operational state of an accelerator pedal;
   a generator inverter for driving the generator with power from at least one of the battery and the drive motor; and
   a power source capacitor jointly used by the drive inverter and the generator inverter.

2. The system of claim 1, further comprising controlling means for operating the generator as a motor to drive the internal combustion engine during a regenerative braking operation by applying power generated by the drive motor thereto via the generator inverter when a charge level of the battery is greater than or equal to a predetermined amount.

3. A control system for a series-type hybrid automobile, the system comprising:
   an internal combustion engine;
   a generator driven by the internal combustion engine;
   a generator inverter for rotatably controlling the generator as a motor for driving the internal combustion engine after a starting operation thereof;
   a battery charged by an output of the generator;
   a drive motor for propelling the automobile;
   a drive inverter for applying power from the battery to the drive motor responsive to an operational state of an accelerator pedal; and
   controlling means for operating the drive inverter to drive the generator and thereby drive the internal combustion engine during the starting operation.

4. The system of claim 3, wherein the controlling means includes switching means for selectively connecting the generator to the drive inverter during the starting operation.

5. A control system for a hybrid automobile, the system comprising:
   an internal combustion engine;
   a generator driven by the internal combustion engine;
   a battery charged by an output of the generator;
   a generator inverter for rotatably controlling the generator as a motor for driving the internal combustion engine;
   a drive motor for propelling the automobile;
   a drive inverter for applying power from the battery to drive the drive motor responsive to an operational state of an accelerator pedal;
   controlling means for operating the generator as a motor to drive the internal combustion engine during a regenerative braking operation by the generator inverter when a charge level of the battery is greater than or equal to a predetermined amount;
   stop control detecting means, in the controlling means, for detecting a stop control of the internal combustion engine by detecting an off state of an ignition key switch of said automobile; and
   current detecting means, in the controlling means, for detecting a current flowing in coils of the generator and for performing step-up regenerative braking control of the generator using the generator inverter, responsive to the detected current when the stop control detecting means detects that the ignition key switch is in the off state.

6. A control system for a hybrid automobile, the system comprising:
   an internal combustion engine;
   a generator driven by the internal combustion engine;
   a rectifier for rectifying an output of the generator;
   a battery charged by the rectified output of the generator;
   a drive motor for propelling the automobile;
   a drive inverter for applying power from the battery to drive the drive motor responsive to an operational state of an accelerator pedal;
   controlling means for operating the generator as a motor to drive the internal combustion engine during a regenerative braking operation by the generator inverter when a charge level of the battery is greater than or equal to a predetermined amount;
   stop control detecting means, in the controlling means, for detecting a stop control of the internal combustion engine by detecting an off state of an ignition key switch of said automobile; and
   current detecting means, in the controlling means, for detecting a current flowing in coils of the generator and for performing a plugging control of the generator by the generator inverter based on the detected current when the stop control detecting means detects that the ignition key switch is in the off state.

7. A control system for a series-type hybrid automobile, the system comprising:
   an internal combustion engine;
   a generator driven by the internal combustion engine;

a generator inverter for rotatably controlling the generator as a motor for driving the internal combustion engine;

a battery charged by an output of the generator;

a drive motor for propelling the automobile;

a drive inverter for applying power from the battery to the drive motor responsive to an operational state of an accelerator pedal; and controlling means for operating the drive inverter to drive the generator and thereby drive the internal combustion engine during a starting operation.

8. The system of claim 7, wherein the controlling means includes switching means for selectively connecting the generator to the drive inverter during the starting operation.

* * * * *